(No Model.) 4 Sheets—Sheet 1.
M. G. WILDER.
LIQUID HEATER.
No. 557,740. Patented Apr. 7, 1896.
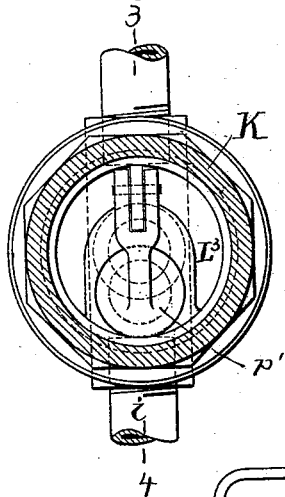
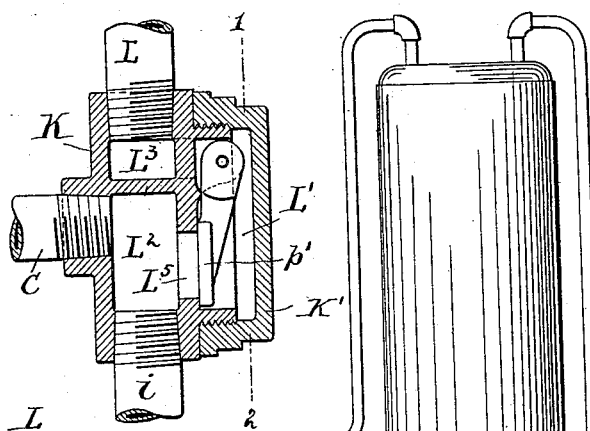
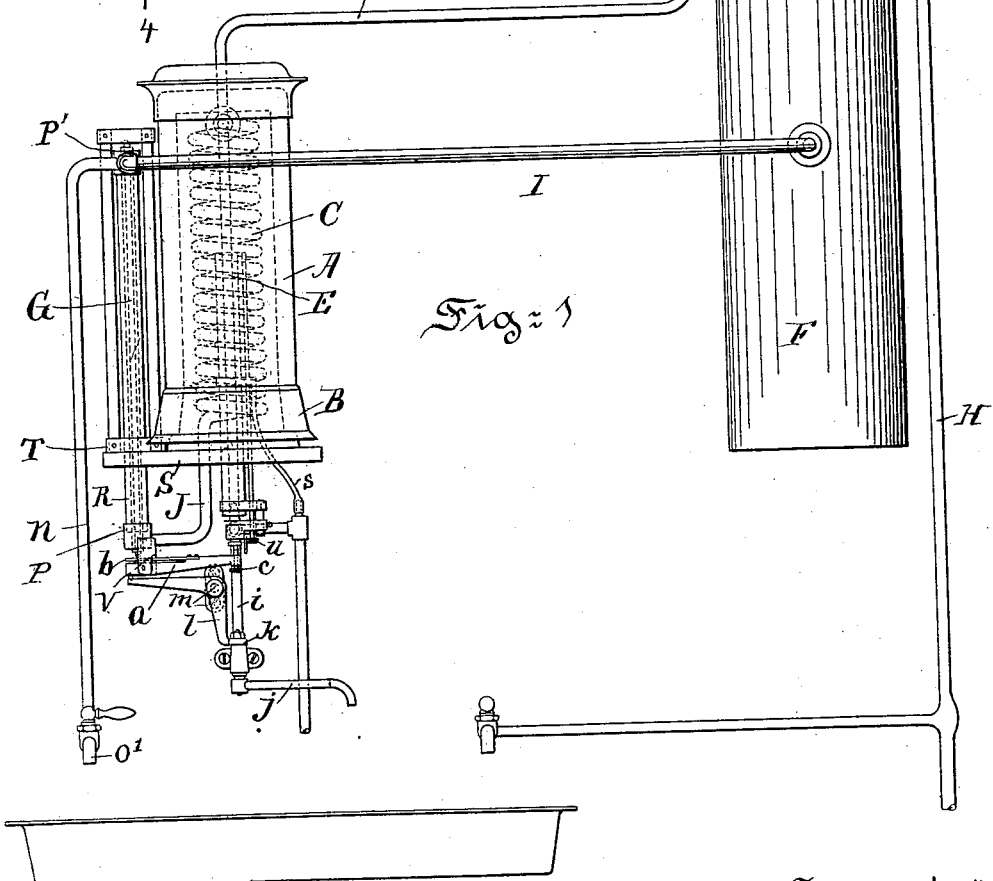
Witnesses:
Inventor,
Moses G. Wilder
by his attorney
Chas. A. Rutter.

(No Model.) 4 Sheets—Sheet 2.

M. G. WILDER.
LIQUID HEATER.

No. 557,740. Patented Apr. 7, 1896.

Witnesses:
Inventor,
Moses G. Wilder
by his attorney
Chas. A. Rutter.

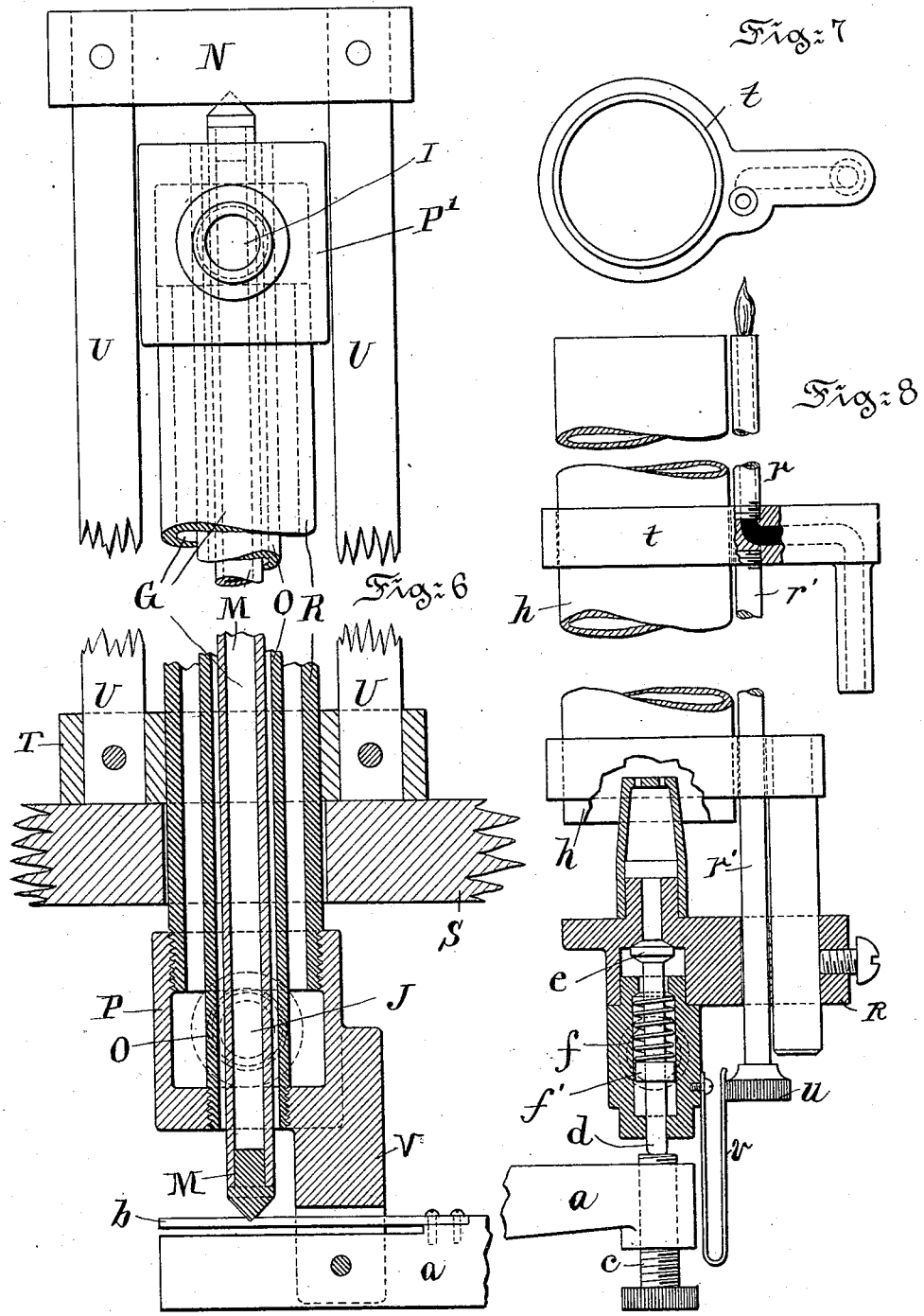

(No Model.)  M. G. WILDER.  4 Sheets—Sheet 4.
LIQUID HEATER.

No. 557,740.  Patented Apr. 7, 1896.

Witnesses:  Inventor,
  Moses G. Wilder
  by his attorney
  Chas. A. Rutter.

UNITED STATES PATENT OFFICE.

MOSES G. WILDER, OF PHILADELPHIA, PENNSYLVANIA.

LIQUID-HEATER.

SPECIFICATION forming part of Letters Patent No. 557,740, dated April 7, 1896.

Application filed August 3, 1895. Serial No. 558,155. (No model.)

*To all whom it may concern:*

Be it known that I, MOSES G. WILDER, a citizen of the United States, and a resident of the city and county of Philadelphia, State of Pennsylvania, have invented certain new and useful Improvements in Liquid-Heaters, of which the following is a specification.

My invention relates to improvements in liquid-heaters, and more particularly to a combined instantaneous and circulating heater. In carrying out the invention I employ a storage tank or reservoir, a heating vessel, which is preferably a coil of pipe, and circulating-pipes leading from the tank to the lower part of the coil or heating vessel and returning from the upper part of the coil to the tank. I also employ a thermostat located in the circulating system for automatically regulating the fuel supply to the burner, a valve for drawing water warmed to the temperature for which the thermostat is adjusted, a hot-water valve and a connecting-pipe for drawing hot water directly from the coil or heating vessel, and a connection from the hot-water valve to the valve which controls the supply of fuel to the burner, so arranged that the act of opening the hot-water valve will also open the fuel-valve and increase the fuel supply to the burner beyond the amount normally allowed by the thermostat, whereby the water will be rapidly heated as it passes through the coil, making my apparatus an instantaneous heater as well as a circulating-heater. I also provide means by which warm water from the tank may be drawn at about the temperature at which it is maintained automatically by the thermostat. As shown, this warm water is drawn from the return-pipe which leads from the tank to the heater. In using the apparatus as an instantaneous heater the hot water is drawn from the outgoing circulating-pipe which leads from the heater to the tank instead of being permitted to go to the tank, and, the fuel-valve being opened, this water is much hotter than that which ordinarily circulates through the return-pipe.

Figure 4:
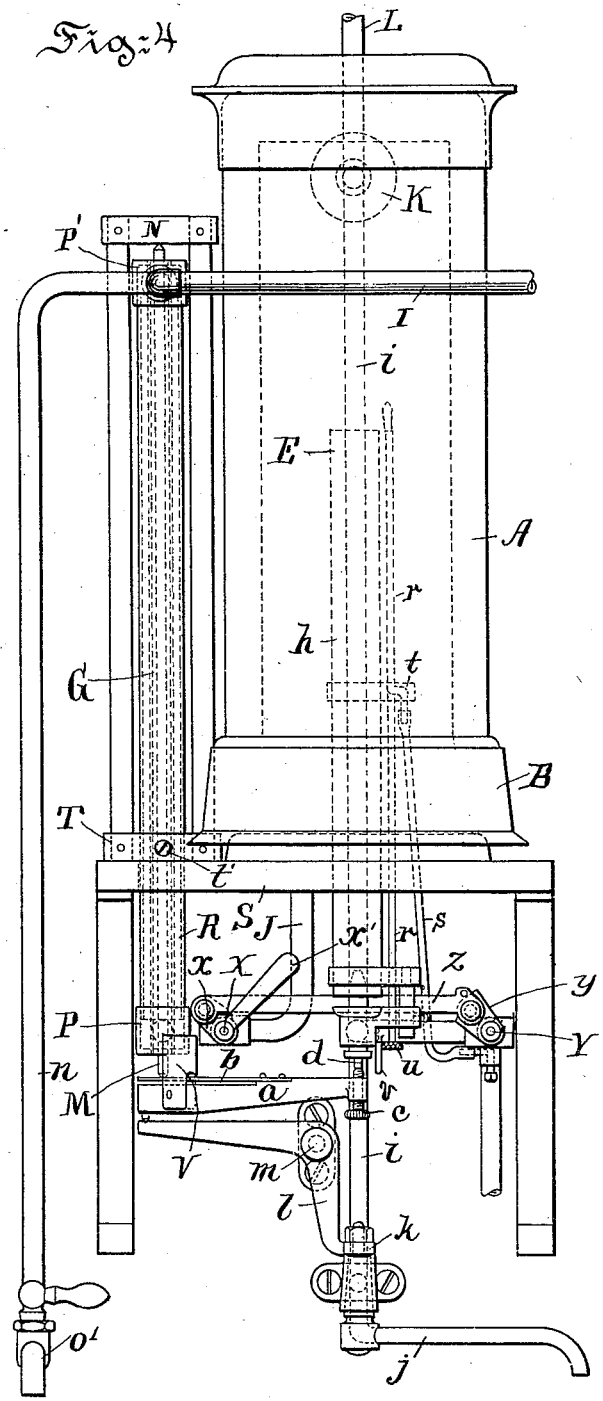
Figure 5:
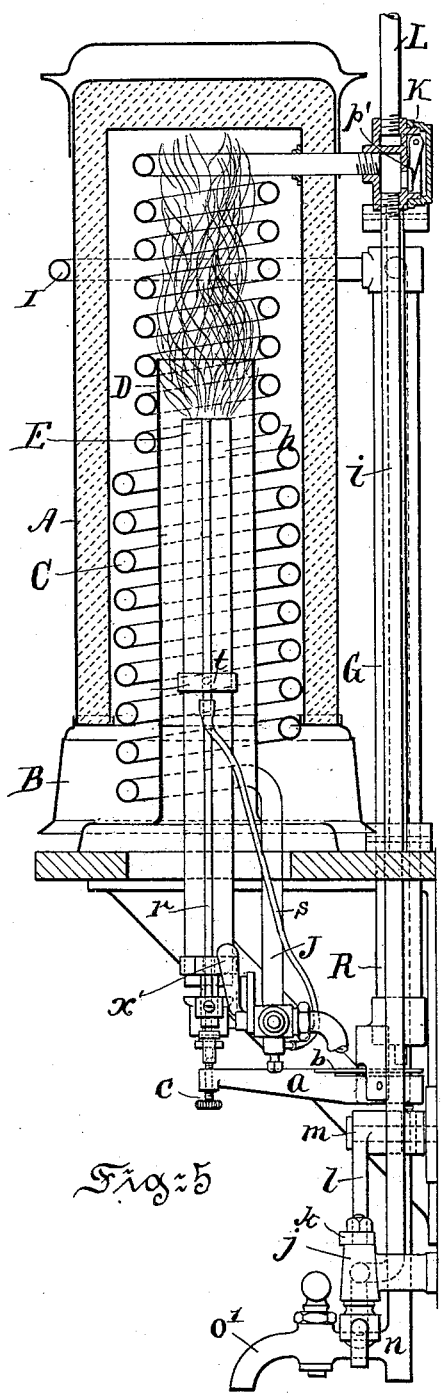
Figure 6:
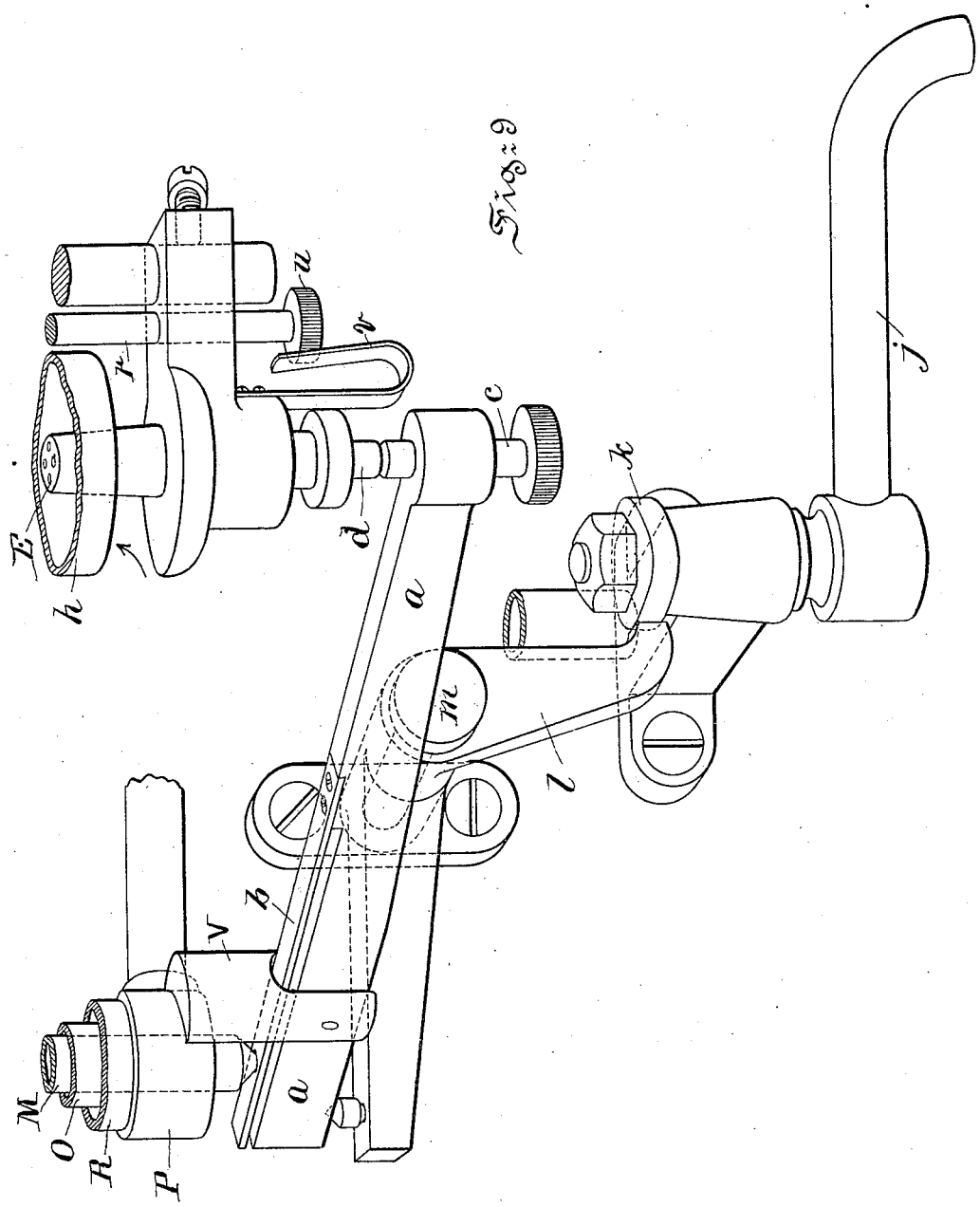

In the accompanying drawings, forming part of this specification, and in which similar letters of reference indicate similar parts throughout the several views, Figure 1 is a side elevation of my combined instantaneous and circulating heater. Fig. 2 is a section through the controlling-valve on line 1 2, Fig. 3. Fig. 3 is a section of Fig. 2 on line 3 4. Fig. 4 is a side elevation of the heater, the thermostat, and the gas and liquid pipes and cocks. Fig. 5 is a front elevation of Fig. 4, the jacket of the heater and other parts being shown in section. Fig. 6 is a view of the thermostat, the upper part being shown in elevation and the lower part in central sectional elevation. Fig. 7 is a plan of bracket which supports and guides the upper end of the pilot-light. Fig. 8 is a side elevation, partly broken away, of the burner and its connections, the lower part of the burner being shown in central sectional elevation. Fig. 9 is a perspective view of the lower part of the thermostat, the gas-burner, the boiling-water faucet, and the levers connecting these parts.

The water-heater proper consists of a coil C of pipe inclosed within a cylindrical casing A, of suitable non-conducting material, resting upon a base B. The casing is closed at the top and open at the bottom. Within the casing and centrally located within the coil C is a burner E of the ordinary Bunsen type. The tube $h$ of the burner extends from below the casing to a point about midway of the height of the coil.

While I have shown a coil and a Bunsen burner for the sake of illustration, it will be evident that for the purposes of certain leading features of my invention it is immaterial what form of vessel is used in heating the water or liquid, and also what form of burner is employed.

I shall hereinafter designate the heating-vessel as the "coil," intending thereby to include any form of heater which can be suitably employed with my invention.

The coil C is supplied with liquid from a tank F through a pipe I, thermostat-jacket G, and pipe J, and the liquid returns from the top of the coil through a pipe L to the upper portion of tank F. The pipes I, J, and L, I shall hereinafter designate as "circulating-pipes." The thermostat consists of a central tube or rod M, preferably of zinc, (best shown in Fig. 6,) the upper end of which bears against a stationary support N, carried by two nonexpanding rods U. As shown, the rods U rest upon the bracket S, which carries the heater. The lower end of the thermostat-rod M bears upon a plate-spring $b$ rigidly attached to a lever $a$. The rod M is free to move lengthwise within a tube O. Surrounding the tube O is a second tube or pipe R, forming between them a jacket G, in which the water circulates from the pipe I to the pipe J. The tubes O and R are secured to casings P P'. The pipe I leads into the casing P' and the pipe J communicates with the casing P. The outer tube R is sustained in a collar T by a set-screw, the collar resting upon the bracket S. The lever $a$ is pivoted, as shown, to a lug V upon the lower head or casing P.

The fuel used in the illustrated apparatus is gas, and the supply is controlled by a fuel-valve $e$, which is normally forced away from its seat by a spring $f$, as shown in detail in Fig. 8, the spring $f$ acting upon a collar $f'$ on the valve-stem $d$. One end of the lever $a$ bears upon the valve-stem $d$ and tends to close the valve as the thermostat-rod M expands. In order to vary the effect of the thermostat, I provide the lever $a$ with an adjusting-screw $c$, which forms the seat for the valve-stem $d$.

The burner-tube $h$ extends upward from a point below the casing A to a point midway of the height of the coil. This burner-tube is surrounded by a chimney D, preferably of non-conducting material, and the lower half of the coil is located between said chimney and the casing A. The upper portion of the burner, where the light is applied, is more or less inaccessible, and in order to light it conveniently I have provided a pilot-light $r$. This light is carried by a collar $t$, which slides upon the burner-tube $h$, and gas is supplied to the light by a flexible tube S, which is connected to a projecting tube on the lower side of the collar $t$. The collar $t$ is sustained by an operating-rod $r'$ having a knob or handle $u$. This rod is attached to the collar $t$ in any suitable manner, and it slides through a perforation in a bracket R upon the burner. When raised, the knob $u$ engages frictionally with a spring $v$, and the light is thus held at a position even with the top of the main burner. The gas to the main burner is turned off independently of the pilot-light by means of a valve Y, and the pilot-light is intended to burn permanently. Hence when the gas is turned on from the main burner it lights instantly from the pilot-light. When it is desired to light the latter, the rod $r'$ is drawn down until the upper end of the tube R is accessible below the base of the apparatus.

By means of the apparatus described the water in the tank F may be kept uniformly at any temperature for which the thermostat is adjusted by means of the set-screw $c$. If set for 180°, for instance, the fuel-valve will be gradually closed as the temperature of the water circulating through the jacket of the thermostat increases, and when the temperature reaches the predetermined point the opening of the valve will be approximately what is necessary to maintain the temperature at that point.

There is a connection H from the main or source of supply to the tank F. When it is desired to draw water from the tank at the tank temperature, it may be drawn through the circulating-pipe I and, as shown, through a connecting-pipe $n$ and a valve $o'$. When the valve $o'$ is opened, the reduced pressure in the pipe R and coil will cause the valve $p'$ to close and water will pass to the valve $o'$ only through the pipe I. When boiling-hot water is required, it is drawn directly from the upper portion of the coil, or, as shown, from a pipe $i$, connecting with the coil and pipe L through a valve $j$. In the pipe L, between its junction with the pipe $i$ and the tank, there is a check-valve $p'$ to prevent water from passing through the pipe L directly to the pipe $i$ when the valve $j$ is opened. As shown, this check-valve is inclosed in a casing K having a compartment $L^2$, with which the pipes $i$ and the coil C communicate, a chamber $L'$, in which the valve is located, the valve-opening $L^5$ between the chambers $L'$ $L^2$, and a chamber $L^3$ communicating with the chamber $L'$ and with the pipe L. When the hot-water valve $j$ is closed, the water circulates from the coil C through the opening $L^5$ and the chambers of the casing to the pipe L, and thence to the tank, the valve $p'$ opening freely. When, however, the valve $j$ is opened, the pressure in the chamber $L^2$ is reduced and the preponderating pressure in the chamber $L'$ closes the valve. The valve-chamber $L'$ is closed by a screw-cap K', which permits of ready access to the valve. When water hotter than the water in the tank is required, it may be instantly furnished by increasing the heat of the burner, so as to heat the water rapidly in the coil, and drawing the water from the valve $j$, as above described.

In order to increase the effect of the burner, I provide means for automatically opening the fuel-valve when the hot-water-delivery valve is opened, said means working independently of the thermostat. As shown, this means consists of a cam $k$, which is attached to and turns with the hot-water valve $j$, and a cam-lever $l$, pivoted at $m$, one end of the lever bearing upon the cam and the other end bearing upon the lever $a$, as best shown in Fig. 9.

When the heater is used as a circulating-heater under the control of the thermostat, spring $b$ is stiff enough to move the lever $a$ and the fuel-valve, the lever $l$ being lowered, so as to not interfere with the movements of lever $a$. When, however, hot water is wanted instantaneously and the valve $j$ is opened, the cam $k$ rocks the lever $l$, which in turn rocks the lever $a$, the spring $b$ yielding to permit lever $a$ to move under the influence of the cam-lever. These parts constitute a train of mechanism between the hot-water valve and the fuel-valve, which is operated positively by the cam, said cam operating to lock the fuel-valve in its open position when the hot-water valve is open. The effect of this movement is to open the fuel-valve and to largely increase the supply of fuel to the burner while the hot-water valve is open.

In using the apparatus as an instantaneous heater the water, previously heated to the temperature for which the thermostat is adjusted, is caused to pass directly to the outlet of valve $j$ instead of going to the tank through the pipe L, and as the fuel-valve is opened simultaneously with valve $j$ the water within the coil (which is supplied from the tank through pipe I and the thermostat) is rapidly heated by the full power of the fuel-burner as long as valve $j$ remains open. Thus a boiling temperature is readily reached, and a stream of boiling water can be secured so long as the valve $j$ remains open, the route of the water being from tank to thermostat through pipe I, thence to the foot of coil and upward through the coil to pipe $i$, and to valve $j$.

I provide means for throwing the heater out of use which includes two valves—one in the circulating-pipe and another in the fuel-supply pipe—so connected that the operation of one will effect the operation of the other. As shown, there is a valve X in the circulating-pipe J and a valve Y in the fuel-supply pipe. The stems of these valves are respectively provided with arms $x$ and $y$, which arms are connected by a rod $z$. The valve X is provided with a handle $x'$. When this handle is operated to open the valve X, the valve Y is simultaneously opened through the connection $z$, and by the reverse movement of the handle the two valves are closed.

What I claim is—

1. In a liquid-heater, the combination with a coil, and a hot-water-delivery valve for drawing water from said coil, of a burner for heating the coil, a fuel-valve for regulating the supply of fuel to the burner, a cam connected to and turning with the said water-valve, and connections between said cam and the fuel-valve whereby the amount of fuel supplied to the burner is increased when the water-valve is opened, substantially as described.

2. In a liquid-heater, the combination with a coil, a hot-water-delivery valve for drawing water from said coil, a burner for heating the coil, and a valve for regulating the supply of fuel to the burner, of a thermostat acted upon by the water circulating through the coil, a connection between the thermostat and the fuel-valve to regulate the supply of fuel automatically, and means controlled by the said water-valve for shifting said connection to open the fuel-valve when the water-valve is opened, substantially as described.

3. In a liquid-heater, the combination with a coil, a hot-water-delivery valve for drawing water from said coil, a burner for heating the coil, and a fuel-valve for regulating the supply of fuel to the burner, of a thermostat, connections between the thermostat and the fuel-valve through which the thermostat automatically regulates said valve, said connections having a yielding portion, and a positive connection between the hot-water valve and said fuel-valve, whereby the said yielding portion is overcome, and the fuel-valve opened, when the hot-water valve is opened, substantially as described.

4. In a liquid-heater, the combination of a coil, a hot-water-delivery valve for drawing water from said coil, a burner for heating the coil, and a fuel-valve for regulating the supply of fuel to the burner, with a thermostat having an expansible rod, a lever $a$ provided with a spring upon which said rod bears, one end of said lever being arranged to operate upon the fuel-valve, a cam connected to and turning with the water-valve, and a cam-lever operated by said cam and operating upon the lever $a$ whereby the fuel-valve is opened upon the opening of the water-valve, substantially as described.

5. In a liquid-heater, the combination with the vertical casing closed at the top, of a burner within and located about midway of the height of the casing, and a pilot-light consisting of a small burner vertically movable from the bottom of the casing to the top of the main burner, means for supporting and guiding said pilot-light adjacent to the main burner, and means for holding said light in its elevated position, substantially as described.

6. The combination with a water-heater provided with a discharge-valve, of a gas-burner provided with a valve and situated contiguous to said water-heater, a thermostatic device contiguous to the water-heater, a train of mechanism extending between the discharge-valve and the valve of the gas-burner, and a yielding connection between the thermostatic device and said train of mechanism, substantially as described.

7. The combination with a water-heater provided with a discharge-valve, of a gas-burner provided with a valve and situated contiguous to said water-heater, a thermostatic device contiguous to the water-heater, a train of mechanism extending between the discharge-valve and the valve of the gas-burner, a yielding connection between the thermostatic device and said train of mechanism, and means for locking said train of mechanism when the discharge-valve is open, substantially as described.

MOSES G. WILDER.

Witnesses:
SAML. SHAW,
JOHN S. MCCONNELL.